United States Patent [19]

Land

[11] 4,119,770
[45] Oct. 10, 1978

[54] ELECTRICAL CELLS AND BATTERIES

[75] Inventor: Edwin H. Land, Cambridge, Mass.

[73] Assignee: Polaroid Corporation, Cambridge, Mass.

[21] Appl. No.: 761,651

[22] Filed: Jan. 24, 1977

Related U.S. Application Data

[63] Continuation-in-part of Ser. No. 684,370, May 7, 1976, abandoned, and a continuation-in-part of Ser. No. 589,334, Jun. 23, 1975, abandoned, and a continuation-in-part of Ser. No. 647,590, Jan. 8, 1976, Pat. No. 4,007,472, and a continuation-in-part of Ser. No. 495,628, Aug. 8, 1974, abandoned.

[51] Int. Cl.$^2$ ............................................. H01M 6/46
[52] U.S. Cl. .................................... 429/152; 429/162; 429/201
[58] Field of Search ............................... 429/133–135, 429/152–162, 201, 224, 229, 249

[56] References Cited

U.S. PATENT DOCUMENTS

| | | | |
|---|---|---|---|
| 2,534,336 | 12/1950 | Cahoon | 429/249 X |
| 2,607,809 | 8/1952 | Pitzer | 429/249 X |
| 2,745,893 | 5/1956 | Chubb et al. | 429/249 X |
| 2,870,235 | 1/1959 | Soltis | 429/162 X |
| 3,060,256 | 10/1962 | Paulson | 429/162 |
| 3,723,181 | 3/1973 | Oakley | 429/152 |
| 3,770,504 | 11/1973 | Bergum | 429/152 |
| 3,888,699 | 6/1975 | Urry | 429/166 |

Primary Examiner—Charles F. LeFevour
Attorney, Agent, or Firm—John W. Ericson

[57] ABSTRACT

A thin flat battery comprising a plurality of cells separated by intercell connectors comprising conductive carbon in a thermoplastic resin, in which each cell consists of a cathode comprising a high viscosity mixture of manganese dioxide and carbon dispersed in an aqueous electrolyte solution and without added binder material, a dry patch zinc anode moistened with electrolyte, and a separator of regenerated cellulose between the anode and the cathode.

9 Claims, 11 Drawing Figures

ELECTRICAL CELLS AND BATTERIES

This applicaton is in part a continuation of my copending U.S. applcation Ser. No. 684,370, filed on May 7, 1976 for Electrical Cells and Batteries, now abandoned and is in part a continuation of my copending U.S. application Ser. No. 589,334, filed on June 23, 1975 for Flat Battery, now abandoned and is in part a continuation of my copending U.S. application Ser. No. 647,590, filed on Jan. 8, 1976 for Flat Battery now U.S. Pat. No. 4,007,472, and is in part a continuation of my U.S. application Ser. No. 495,628, filed on Aug. 8, 1974 and now abandoned.

This invention relates to primary batteries, and particularly to a novel thin flat cell construction and batteries including the same.

Primary batteries of the Leclanche type have been highly developed in several forms. The general goals of these efforts are better shelf life, lower internal impedance and higher yields in manufacturing.

A lower internal impedance implies good electrical and mechanical contact between the component surfaces of the battery. In the conventional "D" cell, this contact is assured by tightly packing the components of the battery into a cylindrical metal can. Constructions using thin flat cells present greater difficulties in this respect.

It has long been known that flat cell batteries inherently are more compact than cylindrical cells, because of the high current to volume ratio obtainable with such cells. However, maintaining good mechanical and electrical contact between the elements in such cells presents a more difficult problem. One approach to this problem is to stack the cells of a flat battery in a container, and force them together by wedges, as shown for example in U.S. Pat. No. 1,508,987, issued on Sept. 16, 1924 to Rider et al. Another approach is to stack the battery components under pressure and secure them in that state with tape, and then to encapsulate the battery in a thermoplastic material. That procedure is described in U.S. Pat. No. 1,797,161, issued on Mar. 17, 1931 to Strohl et al. A similar use of tapes to hold cell components together is described in U.S. Pat. No. 2,844,641, issued on July 22, 1958 to Lang et al.

The above expedients are much better adapted for use with high-voltage batteries comprising many cells, such as the "B" batteries formerly widely used for radios and the like, than for use with thin batteries comprising a few cells, and consequently having areas that are great in proportion to their thicknesses. Such thin batteries are highly desirable for photographic applications, especially for such high current, short time applications as powering a film advance motor for a camera, or charging an electronic flash unit. It would be quite undesirable to require a casing for a thin battery to hold it in compression.

Prior to this invention, one proposed solution to the problem of attaining coherence in a thin, flat battery was to incorporate adhesive binders in the several layers of the battery to hold the layers together and to each other. Such constructions are described, for example, in U.S. Pat. No. 3,770,504, issued on Nov. 6, 1973 to Bernard C. Bergum. In particular, as described in the Bergum patent, dry patch anode and cathode constructions are employed. The cathode patch is described as prepared by depositing an aqueous slurry containing manganese dioxide, carbon, and various binders and dispersants on a conductive plastic current collector substrate. The deposited slurry is then dried down to produce a dry patch cathode layer about 7 mils thick. Over this dry patch is deposited a coating of gel electrolyte, and over the gel electrolyte a conventional porous separator. The anode comprises zinc flame-sprayed on the back side of a carbonaceous collector sheet, coated with a layer of gel electrolyte, and by that means adhereed to the other side of the separator. Other similar structures have employed a dry patch anode of zinc powder adhered to the anode collector with a binder.

The dry patch form of construction is a perfectly practical one, but has limited effectiveness in high current drain applications, such as charging an electronic flash unit. There are two basic difficulties with the construction for that purpose. First, the inclusion of binders, which are necessarily non-conductive materials, in the battery inherently increases the internal impedance of the battery. More subtly, when the cathode mix is optimized for the dry patch construction, it is found to require a very high ratio of manganese dioxide to carbon for bcst results. In particular, about 25 parts of manganese dioxide per part of carbon, by weight, are typically found to produce the best results in terms of the balance of all necessary and desirable properties.

It is well known in the battery art that for high current drain applications, wetter mixes including higher proportions of carbon to manganese dioxide are required. This point is discussed in an article by Richard Huber appearing in *Batteries*, Vol. 1, "Manganese Dioxide", edited by Carl V. Kordesch and published by Marcel Dekker, Inc. of New York in 1974. The article begins on page 152 and is entitled 3.4.3 *Influence of Mix Formulation on Cell Performance.* This article discusses cathode mixes in cylindrical cells, particularly pasted and paper lined "D" size cells. On page 155, typical mix compositions are given which range from about 10 to about 16 percent water by weight.

A considerably wetter mix is proposed in the above-cited U.S. Pat. No. 2,844,641. In this patent, in which encircling tapes are provided to hold the completed battery together, the cells include paper separators and a depolarizer mix comprising the usual manganese dioxide, ammonium chloride, zinc chloride, water and carbon, in which the water is given as 20 percent by weight of mix.

Much larger amounts of water have been proposed for use in cathode mixes designed for operation at extremely low temperatures. For example, U.S. Pat. No. 3,060,256, issued on Oct. 23, 1962 to John W. Paulson, proposes up to 36 percent of water, using a lithium chloride-zinc chloride-ammonium chloride electrolyte, for use at −40° C. For this very special condition of use, the factors governing the selection of the amounts of water and electrolytes would evidently be quite different from those involved in choosing an electrolytic solution for use at higher temperatures. In any event, attempts to prepare mixes this wet for use at normal temperatures have shown that they would be unsatisfactory in that the water tends to separate, the electrical properties are poor, and the mix is so fluid that it will not stay in place during battery assembly.

As noted above, tying the battery together with tapes is not desirable for the construction of batteries having a high surface to thickness ratio, because this feature would require substantial end plates with thicknesses that would defeat the purpose of such batteries. Accordingly, it is a particular object of this invention to improve the cohesion in thin flat cells so that external compression is not required, while improving the electrical properties of such cells.

Another fundamental difficulty that has been found with prior art constructions including wet mixes is that they have a relatively short shelf life and are characterized by low yields. In particular, the conventional separator, of porous fibrous materials such as Kraft paper, evidently permits the migration of particles which cause internal electrical shorting of the cell. A further particular object of this invention is to improve the shelf life of thin flat batteries using wet electrode mixes.

More broadly, the object of this invention is to improve the yields and shelf life of thin laminar batteries, while improving the capability of such batteries to rapidly recharge an electronic flash unit or perform other similarly demanding tasks requiring a high current drain capability.

Briefly, the above and other objects of this invention are attained by a novel battery construction characterized by the use of an extremely wet cathode slurry containing, for example, from 22 to 32 percent by weight of water, and by a relatively low weight ratio of manganese dioxide to carbon, preferably 8 to 1, in which the electrolytes comprise zinc chloride and ammonium chloride with mercuric chloride specifically excluded in preferred embodiments. Preferably, the cathode mix includes no added binder. The cathode mix is situated between a conventional carbon-filled thermoplastic resin serving as current collector and intercell connector, and a cellophane separator overlying a frame which contains the cathode mix. The anode side preferably comprises a layer of gel electrolyte and a conventional dry patch zinc anode deposited on another layer of the conductive plastic intercell connector. The cellophane separator is preferably very thin; for example, 1.34 mils in a preferred embodiment. It has been discovered that a battery constructed in this manner has a surprising capability for rapidly recharging an electronic flash unit, compared with other similar constructions, and that it is inherently self-coherent to the point that it does not require an external compressive system even for relatively high surface to thickness ratios such as 20 to 1. Shelf lives of such batteries have been found to be highly satisfactory.

The manner in which a battery in accordance with the invention is constructed, and the characteristics of batteries so made, will best be understood in the light of the following detailed description, together with the accompanying drawings, of preferred embodiments thereof.

Figure 10:
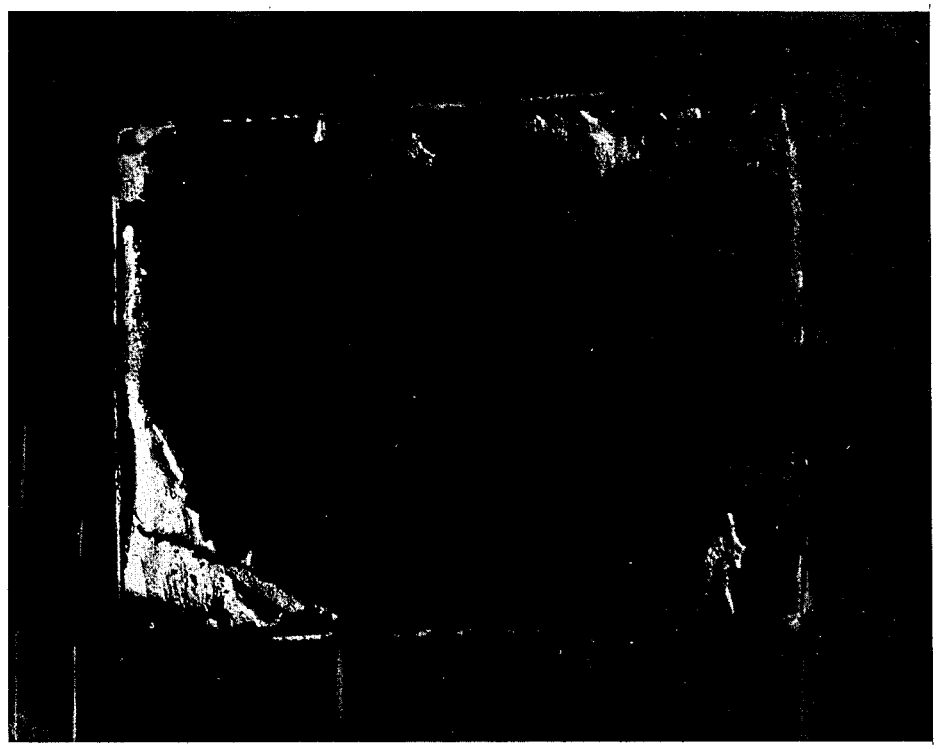
Figure 10:
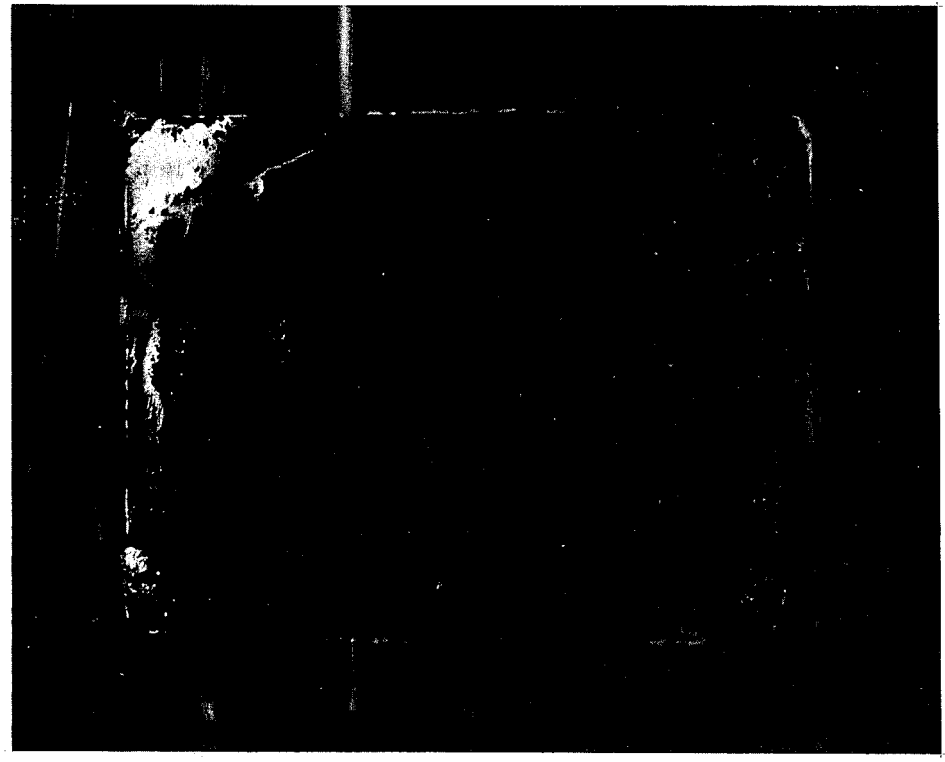
Figure 11:
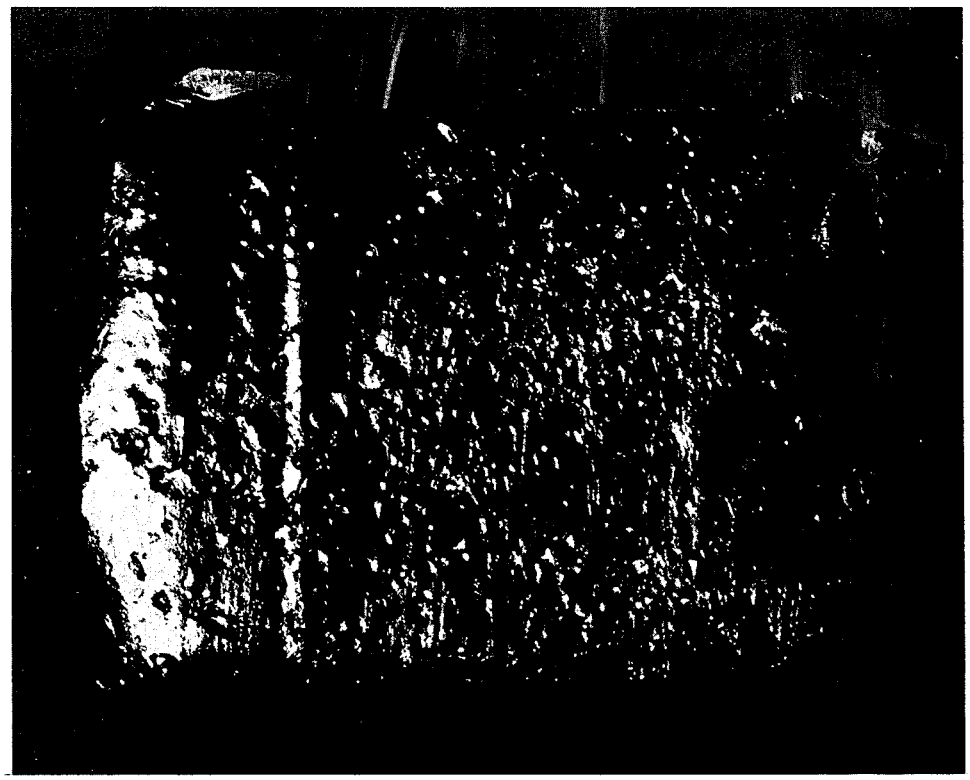
Figure 11:
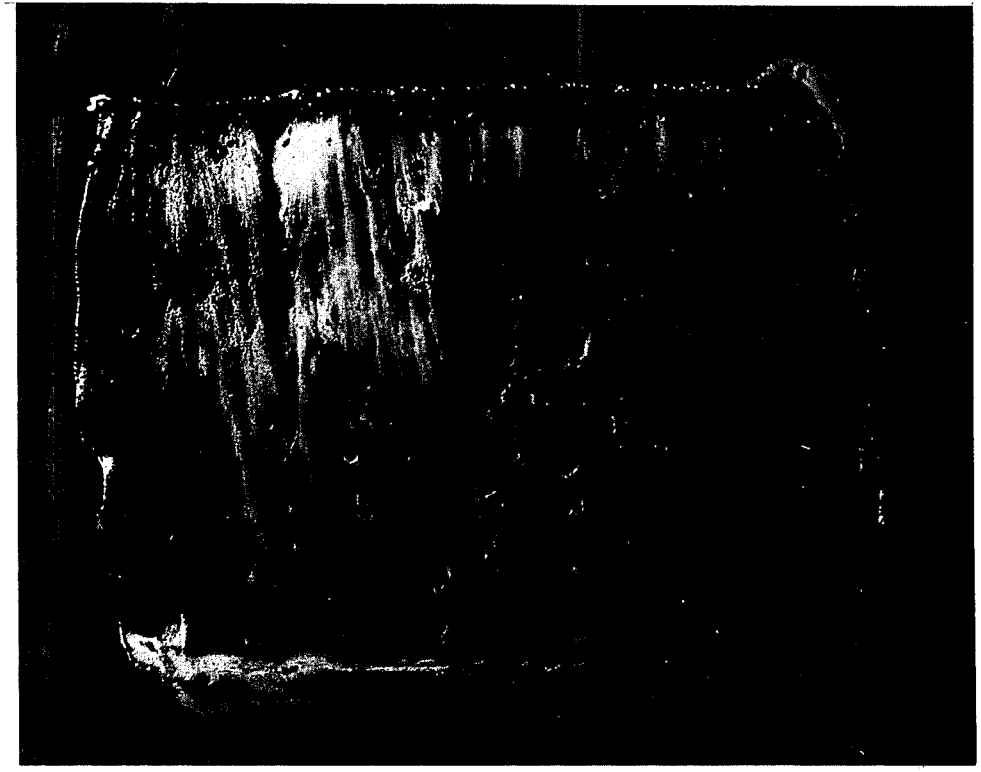

FIG. 10 is an enlarged photograph of the separated surfaces of a laminate of two sheets of conductive plastic with a cathode slurry in accordance with a preferred embodiment of the invention, illustrating the failure mode when the laminate was peeled apart; and FIG. 11 is an enlarged photograph of the separated surfaces of a laminate of two sheets of conductive plastic with a less preferred cathode slurry in accordance with the invention, illustrating the failure mode when the laminate was peeled apart.

Figure 1:
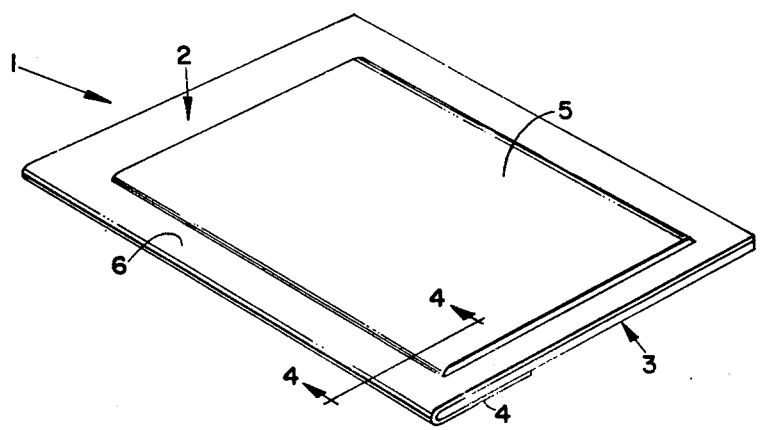
FIG. 1 is a schematic perspective three-quarter sketch of a battery in accordance with the invention, prior to final packaging.

As shown in FIG. 1, a thin, flat battery 1 comprises an outer anode terminal plate 2, of tinned steel, aluminum, or the like, bonded to other components of the battery generally designated 3, and to be described in more detail below, and folded over as indicated at 4 to form a negative terminal in generally the same plane as a positive terminal formed in a manner to be described below.

As indicated, the battery is characterized by a generally raised central region 5 surrounded by a slightly depressed marginal portion 6 effected during the heat sealing of the battery in a manner to be described.

Figure 2:
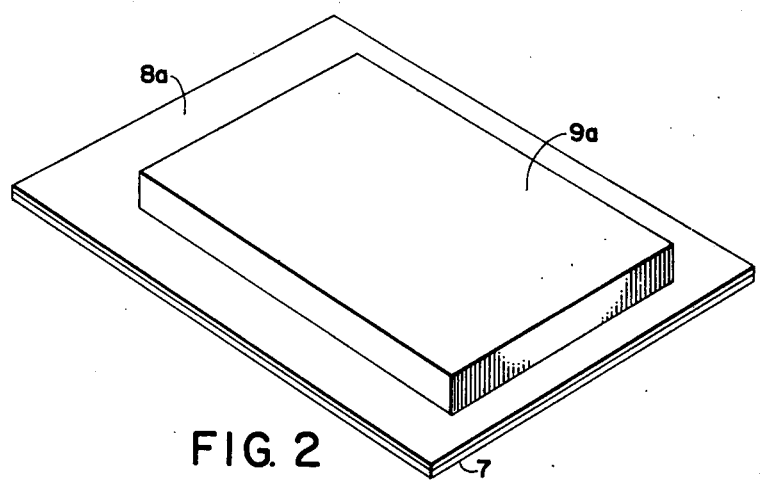
FIG. 2 is a schematic perspective three-quarter view of a cathode collector plate and terminal on which there is deposited a layer of cathode slurry in an early stage of the assembly of a battery in accordance with the invention.

FIG. 2 shows the cathode and positive terminal of the battery 1 of FIG. 1 in an early stage of manufacture. Vertical dimensions have been greatly exaggerated with respect to horizontal dimensions to illustrate the relative thicknesses of the internal components of the battery in relatively close porportion to those preferably employed. The positive terminal comprises an outer metal layer 7, of tinned steel, aluminum, or the like, identical in thickness to the negative terminal 2. While various thicknesses may be employed, in practice it is preferred to use sheet metal about 2 mils in thickness where tinned steel is the chosen metal.

Bonded to the metal positive terminal 7 is a sheet of carbon-filled thermoplastic material 8a. In the presently preferred practice of the invention, the sheet 8a is made of an electrically conductive carbon-impregnated vinyl film sold by Pervel Industries under the trademark "Condulon", having a thickness on the order of about 2 mils, and including approximately 34 percent of carbon by weight. The carbonaceous layer 8a serves as a current collector and is characterized by being electrochemically inert and being essentially impervious to liquid electrolyte.

Deposited within the boundaries of the current collector 8a is a layer of cathode mix 9 containing manganese dioxide, carbon, ammonium chloride, zinc chloride and water in proportions to be discussed below. This layer and other such layers to be described can be deposited on the substrate by silk screening, by extrusion, or by other conventional coating processes. For ease in adapting to a particular coating operation, small amounts of polymeric binders or dispersants may be added. However, preferably no such binders or dispersants are added to the cathode mix as all such additives degrade the electrical performance of the finished battery at least to some extent. The extremely wet cathode mixes without binders or dispersants which are preferred have exhibited a surprising ability to adhere to the adjacent layers of the battery and to be substantially cohesive.

Figure 3:
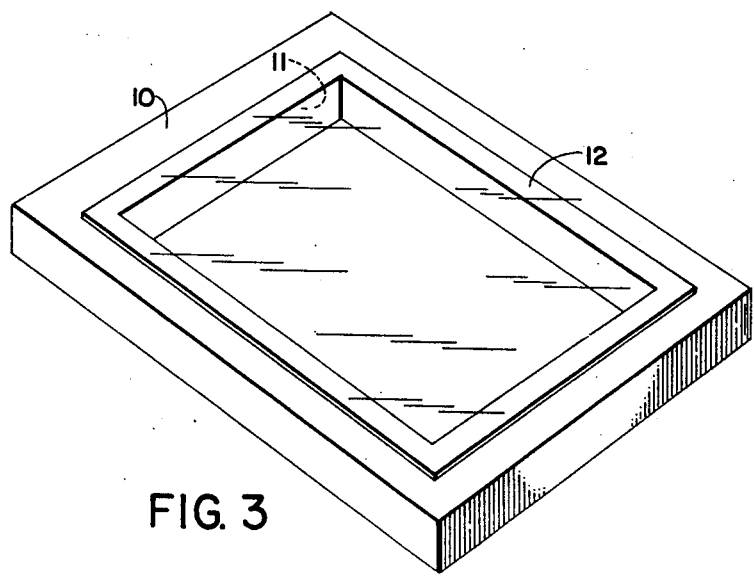
FIG. 3 is a schematic perspective three-quarter view of a separator and frame construction used in batteries in accordance with the invention.

FIG. 3 shows a separator and frame construction adapted to cooperate with the cathode of FIG. 2 in constructing a cell in accordance with the invention. The frame is shown at 10 and may be made of any conventional thermoplastic frame material such as polyvinyl chloride or the like. However, in the practice of the invention in its presently preferred embodiment, the frame is made of Versalon TPX 1140 hot melt adhesive, a polyamide resin made and sold by General Mills, Incorporated, of Minneapolis, Minn. Another suitable frame material is a fibrous material, such as that conventionally employed in primary battery separators, filled with a thermoplastic polyamide resin such as Versalon TPX 980, also made and sold by General Mills, Incorporated, or the like. As indicated, a rectangular opening 11 is formed in the frame 10, and over this opening is laid a separator membrane 12, preferably of regenerated cellulose such as PUD-O cellophane as manufactured and sold by E. I. Du Pont De Nemours & Company of Wilmington, De. It is necessary that the cellophane be free of plasticizers and humectants, particularly glycerine or the like, which would cause destructive gassing in the Leclanche cell environment by reaction with the manganese dioxide in the cathode. It is also highly desirable that the membrane 12 be quite thin, for example, from 1 to 2 mils in thickness, and in the presently preferred embodiment, 1.34 mils in thickness.

It is rather surprising that the cellophane separator is practical for use in a Leclanche cell environment, where highly porous fibrous woven or non-woven separator materials, and particularly Kraft paper, have traditionally been preferred. Cellophane has been used in other systems, such as silver-zinc alkaline systems, in which it is found to present various problems which the prior art has addressed. In particular, it is only rather selectively permeable, to the extent to which it may present a gas barrier. Thus, in U.S. Pat. No. 3,758,343 to S. A. Magritz for "A Silver Zinc Button Cell", granted on Sept. 11, 1973, a silver zinc button cell is disclosed in which a cellophane separator is used in combination with a porous separator of felted material, and the cellophane is perforated to allow gas to pass through. The swelling of cellophane in alkaline solution is discussed in U.S. Pat. No. 2,594,709, which also shows a zinc silver cell with a cellophane separator. Other patents which show a cellophane membrane in conjunction with a porous separator are U.S. Pat. No. 3,418,172 to Fletcher, granted on Dec. 24, 1968 and dealing with an alkaline cell containing a powdered zinc anode and a mercuric oxide, manganese dioxide or silver oxide cathode material, and U.S. Pat. No. 2,745,893 to Chubb et al., granted on May 15, 1956 for "Cuprous Chloride Magnesium Cell with Cellophane Membrane." Other patents dealing with alkaline cells of the silver zinc type propose treating the cellophane chemically in various ways to improve its properties; these include U.S. Pat. Nos. 3,013,099, granted on Dec. 12, 1961 to M. Mendelsohn; 3,091,554, granted on May 28, 1963 to Charles M. Rosser et al.; and 3,224,907, granted on Dec. 21, 1965 to Rosser et al.

The basic reasons that would deter the artisan from employing a cellophane separator in a Leclanche system are first, that porous fibrous separators have previously been found to work well, and second, that a microporous separator of any kind would be expected to considerably increase internal impedance. For example, in U.S. Pat. No. 2,229,431, issued on Jan. 21, 1941 to George H. Young, it is proposed to replace the conventional separator in a Leclanche system with a very thin film of synthetic resin that is permeable through a multitude of minute pinholes. The resins proposed are all non-hygroscopic and do not take up moisture. They are laid down on a zinc plate in a solvent, and, either through rapid evaporation or by solvent unbalance, are rendered porous on drying. The coating solutions are described as being laid down to 5 milligrams or less to the square inch, so that the wet coat would be 0.3 mils or less; since the solvent is from 50 to 95 percent of the solution, the dried film would be extremely thin, and probably discontinuous.

In U.S. Pat. No. 3,784,413, issued on Jan. 8, 1974, a somewhat different problem involved in the construction of cylindrical cells is addressed, and a particular microporous separator of polyvinyl alcohol is proposed. It is there noted that pressure exerted when the carbon post is inserted into the bobbin may drive the cathode mix through a conventional separator and into contact with the anode. To prevent that occurrence, other microporous separators had been proposed, but these increased internal impedance and caused a counter electromotive force because of the decreased diffusion velocity of zinc ions through the separator. The polyvinyl alcohol separator was proposed because it is highly swollen in the Leclanche system, and even dissolves at a sufficiently high concentration of zinc ions. Since cellophane is highly swollen in alkaline systems, but progressively less so as the pH is decreased, it is surprising that its use in a Leclanche system would not cause the problems described in U.S. Pat. No. 3,784,413. In Leclanche systems, the pH is less than 6, and typically is about 4.5. In particular, the salts may begin to precipitate at a pH of 5.8, so that operation at or above that level is highly undesirable.

The cellophane separator 12 shown in FIG. 3 is preferably bonded to the frame 10 prior to assembly with the other components. A useful temporary bond for this purpose can be effected between the cellophane 12 and the polyamide surface of the frame 10 by application of moderate heat. After assembly of the battery in the manner described, this bond apparently is destroyed, but it is a useful aid in assembly in the manner to be described.

Figure 4:
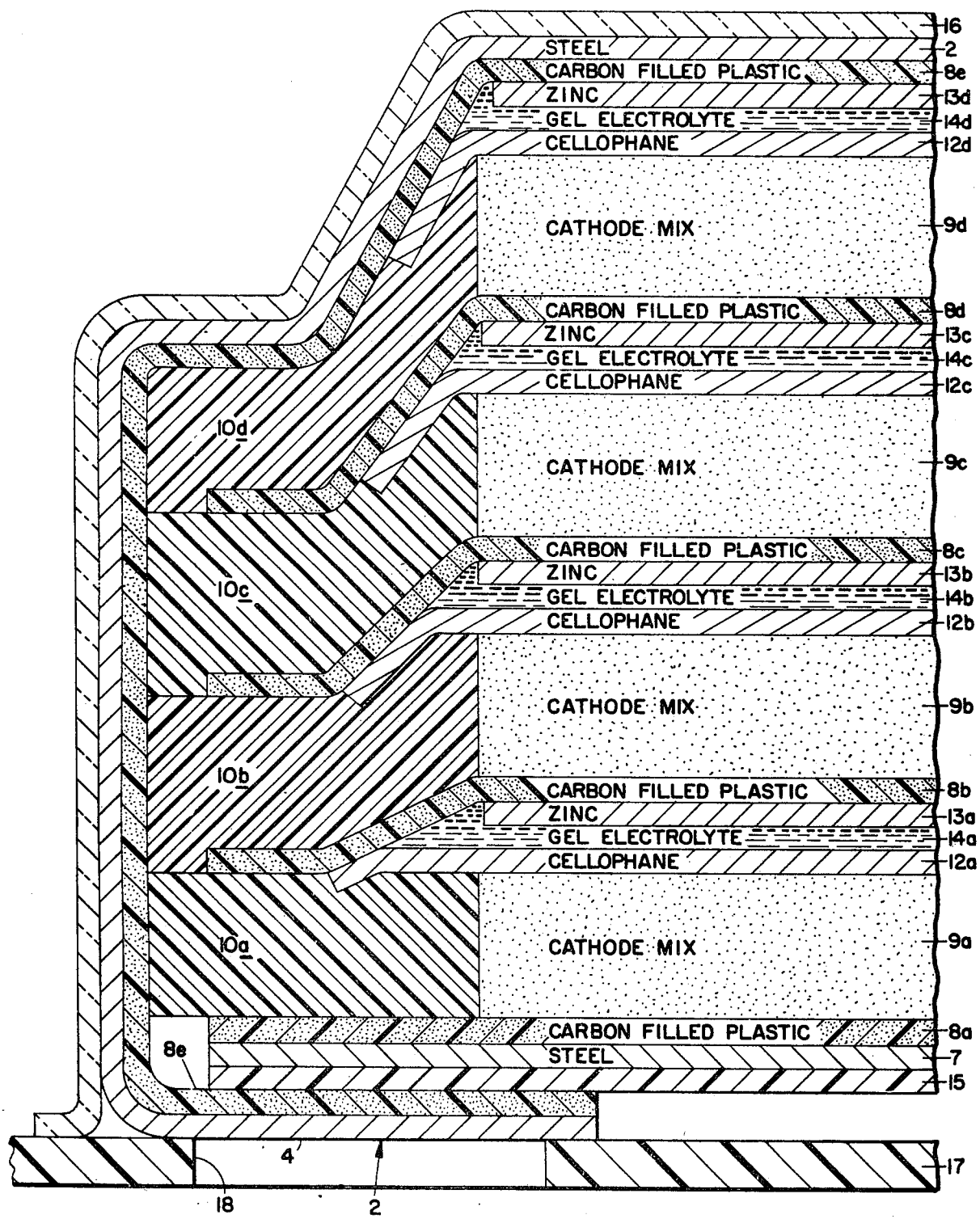
FIG. 4 is a fragmentary schematic elevational cross-sectional sketch, taken substantially along the lines 4—4 in FIG. 1 and showing the internal construction of a battery in accordance with the preferred form of the invention.

Referring next to FIG. 4, there is shown a complete battery of the type shown in FIG. 1, including an external, semi-permeable wrapper and a cardboard base as utilized in commercial practice. As described above, the cathode terminal 7 and current collector carbonaceous sheet 8a are prelaminated, and a layer of cathode mix 9a is deposited on the surface of the sheet 8a as described above. A prelaminated frame 10a with a cellophane separator 12a temporarily adhered to it as described above is next placed over the cathode mix. As a separate operation, a set of three duplex electrodes is prepared. These consist of intercell connectors 8b, 8c, and 8d, made of carbon-filled thermoplastic material such as the 2 mil Condulon conductive sheets described above. On one side of the intercell connectors 8b, 8c, and 8d, a zinc patch anode layer 13a, 13b and 13c, respectively, is deposited by any conventionally known technique, such as silk screening or the like, utilizing the anode patch composition described below or other suitable desired composition, and then dried. A wet slurry layer of cathode mix 9b, 9c, and 9d is deposited on the other surfaces of the intercell connectors 8b, 8c and 8d in the manner described above for the deposition of the layer 9a on the sheet 8a. As soon as the first frame 10a with its cellophane separator 12a is in place over the cathode mix 9a, a layer of gel electrolyte 12a is coated on the cellophane separator 12a to a depth of preferably about 5.4 mils. The gel electrolyte composition may be as described below.

Next, the first of the duplex electrodes comprising the zinc dry patch 13a, intercell connector 8b and wet slurry cathode patch 9b is placed over the gel layer on the cellophane separator 12a. A second frame 10b with a previously temporarily adhered cellophane separator 12b is then placed over the cathode patch 9b. The cellophane separator 12b is then coated with gel electrolyte 14b, in the manner described for the coating 14a above, whereupon the next duplex electrode comprising the layers 13b, 8c and 9c is deposited over the gel electrolyte. A frame 10c with a cellophane separator 12c is next installed. The separator 12c is coated with gel electrolyte 14c as before. The final intercell connector comprising the layers 13c, 8d and 9d is then put in place, and a frame 10d with a cellophane separator 12d is put on. The metal sheet 2, comprising the negative anode terminal 2, is previously prelaminated with a carbon-filled plastic sheet 8e, which may be a 2 mil Condulon carbonaceous sheet as described above. After a layer of gel electrolyte 14d has been applied to the cellophane separator 12d in the manner described above, this prelaminated sheet, which has a previously applied zinc dry patch anode 14d, is applied in the manner described above and placed over the gel electrolyte coating 12d. The laminated steel and carbon filled plastic layers 2 and 8e are next wrapped around one side of the battery as illustrated in FIGS. 1 and 4 to provide the negative terminal portion 4 of the battery.

The assembled battery is next subjected to peripheral heating, for example, by a heating technique wherein the central region of the battery is cooled while the temperature of the peripheral region is raised from room temperature to about 275° F. at the peripheries of the innermost frames 10b and 10c. The peripheral region is next subjected to pressure, causing a compaction of approximately 25 percent which seals the frames 10a through 10d together to form a liquid impervious boundary, at the same time serving to seal the intercell connectors and cathode and anode terminal connectors 8a through 8e to the frames. Prior to this operation, an insulating sheet 15, for example, of 2 mil polyethylene, is inserted between the steel cathode terminal 7 and the carbon-filled plastic anode current collector 8e to insulate the cathode terminal from the anode terminal. Next, a liquid impervious, semi-gas permeable outer covering 16, of polyethylene, polyvinyl chloride, or the like, for example, about 1 mil in thickness, is wrapped over the battery so assembled and adhered by any suitable bonding mechanism to a cardboard base plate 17. Apertures such as 18 through the cardboard base plate 17 serve to admit contacts to the terminals such as 4 of the battery for connection to external apparatus.

Upon dissection of a battery made as just described, the cellophane separator will be found to be detached from the frame. It is thus free to swell between cathode and anode without the destructive curling or wrinkling that might occur if it was firmly attached at the edges.

Batteries in accordance with the preferred embodiment were made as described in the following example.

EXAMPLE I

A cathode mix was made with the following composition, in which quantities are given both in weight percent, based on the total weight of materials, and in grams.

|  | Wt. % | Grams |
| --- | --- | --- |
| $MnO_2$ | 51.81 | 200 |
| Shawinigan, Black | 6.48 | 25 |
| $H_2O$ | 27.80 | 107.3 |
| $NH_4Cl$ | 9.56 | 36.9 |
| $ZnCl_2$ | 4.35 | 16.8 |

The Shawinigan Black is a highly structured carbon black in the "100% compressed" form, as made and sold by Shawinigan Products Corp., N.Y., N.Y. The ammonium chloride and zinc chloride were dissolved in the water. The manganese dioxide and carbon were blended together, then mixed into 141 grams of the electrolyte solution and stirred until thoroughly dispersed. The balance, 20 grams, of the electrolyte was added as convenient to temporarily reduce the viscosity of the mix, and thereby assist in blending, as maximum viscosity was approached. Blending was continued until a homogeneous, highly viscous and cohesive mass was obtained.

The cathode mix made as just described was coated on 2 mil Condulon sheets 2.75 inches by 3.42 inches to a depth of 25 mils, over a central area about 2½ inches by 1⅞ inches; the weight of mix per cathode was 3.5–4.0 grams.

The anode patches were made from the following composition, in which composition is expressed in parts by weight, in accordance with the presently preferred practice of the invention:

| Zinc powder | 1,000 |
| --- | --- |
| $H_2O$ | 149.2 |
| Benton LT Dispersant | .61 |
| Tetrasodium pyrophosphate | .25 |
| Shawinigan Black | 5 |
| Polytex 6510 Latex | 39.05 |

In the above composition, Polytex 6510 is an acrylic emulsion resin made and sold by Celanese Corp., of Newark, N.J. Benton LT is an organic derivative of hydrous magnesium aluminum silicate, as made and sold by National Lead Co., Inc. of N.Y., N.Y.

This composition was laid down on the carbonaceous sheet in the manner described above, and then heated to dryness to form a dry patch of an area about 2½ by 1⅞ inches and from 1½ to 2 mils in thickness, and a weight of 0.5 to 0.6 grams. On the intercell connectors this operation was performed before the cathode mix was deposited.

The gel electrolyte employed in the batteries to be described had the following composition, expressed as parts by weight:

| $NH_4Cl$ | 21.8 |
| --- | --- |

-continued

| | |
|---|---|
| ZnCl₂ | 9.9 |
| HgCl₂ | 1.9 |
| H₂O | 63.5 |
| Natrosol 250 HHR | 2.9 |

Natrosol 250 HHR is hydroxyethyl cellulose, sold by Hercules, Inc. of Wilmington, Del.

This composition was coated over the cellophane separator to a thickness of 5.4 mils.

Five four-cell batteries, identified as IA through IE below, were made as described above. Open circuit voltages (OCV), and closed circuit voltages (CCV) measured with a 3 ohm load for 0.1 seconds, were determined after 4 days and are given below:

| Battery | OCV | CCV |
|---|---|---|
| IA | 6.77 | 6.28 |
| IB | 6.74 | 6.23 |
| IC | 6.76 | 6.27 |
| ID | 6.79 | 6.31 |
| IE | 6.79 | 6.33 |
| Average | 6.77 | 6.28 |

A good mix is characterized by the retention of substantially all the water without the formation of an external liquid film and has a matte black surface with a relatively dry appearance. It feels rather clay-like and plastic, and will adhere tenaciously to conductive plastic and effect an excellent electronically conductive bond thereto. Such mixes are preferably made under low shear conditions, as with a motor driven worm auger, a Pony mixer, or the like. The Pony mixer is a well known type that is shown and described, for example on pages 1546 and 1547 of the Chemical Engineers' Handbook, second edition, edited by Dr. John H. Perry and published in New York and London by McGraw-Hill Book Co., Inc. in 1941.

When the mixing is too vigorous or unduly prolonged, viscosity is reduced, the mass is more mud-like in feel and appearance, having a wet and glossy look contributed by a perceptible film of liquid forming on the surface that is thought to act as a separative film between the conductive plastic and the body of the cathode mix.

Figure 6:
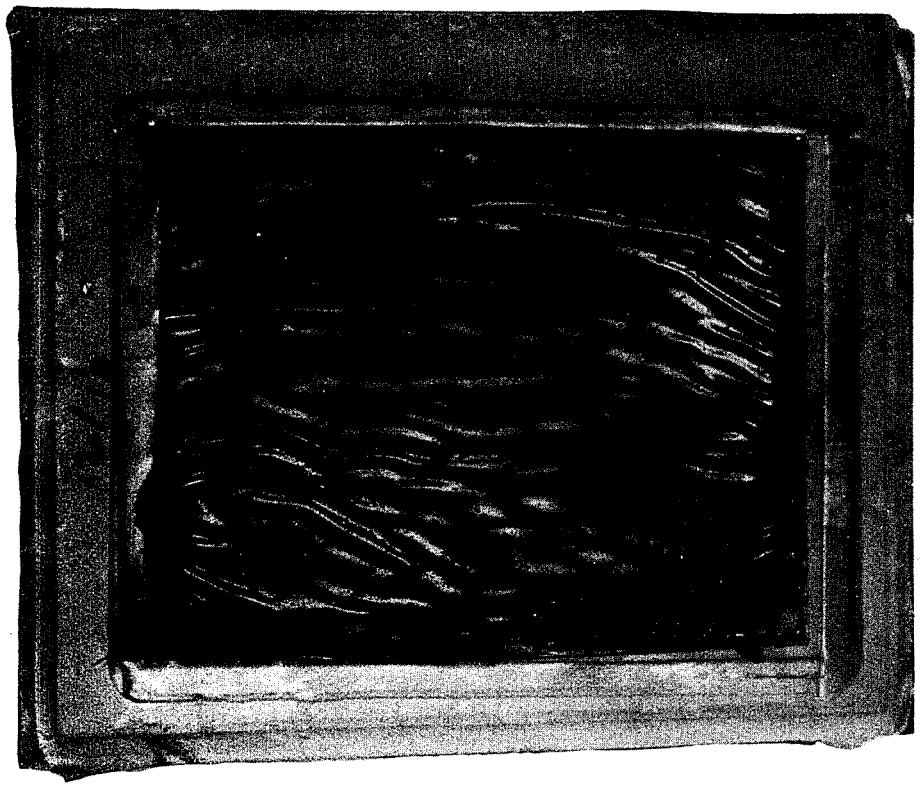
FIG. 6 is an enlarged photograph similar to FIG. 5 but showing the surface texture of an exposed cathode slurry mixed for longer than the optimum time.
Figure 5:
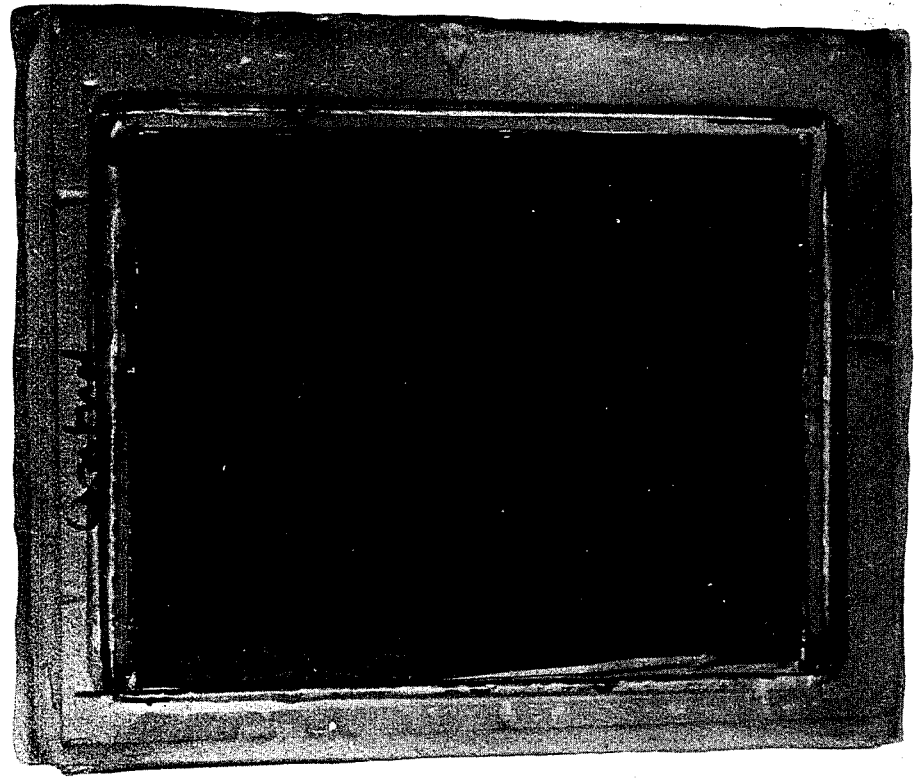
FIG. 5 is an enlarged photograph of a battery in accordance with the invention having a cathode slurry exposed to show its surface texture.

The characteristic difference in appearance between the best cathode mixes and one that is of the same composition, but has been overmixed, may be seen by comparison of FIGS. 5 and 6. These are enlarged photographs of batteries that have had portions of the laminae cut away with a razor blade and lifted off to expose the surface of a cathode. Both batteries were made with the same compositions and amounts of material, except for differences in the cathode mix time. In each case, portions of the upper layers were cut away until a cellophane separator overlying one of the cathode layers was exposed. The separator was then cut away removed to expose the cathode layer, whereupon the photograph was made as quickly as possible; i.e., in less than a minute. The effects shown in FIGS. 5 and 6, especially in FIG. 6, are quite fugitive, as the layers begin to dry out and change in appearance soon after they are exposed to the air. FIGS. 5 and 6 were both made with battery and camera in the same relative position and with identical lighting.

FIG. 5 shows a cathode mix blended for four minutes in a Pony mixer. The characteristic dull black matte dry appearance is present immediately upon removal of the separator. The furrows formed in the surface are typical of those produced with cellophane separators, and are apparently caused during the swelling of the separator in the electrolyte when the battery is assembled. Portions of the mix adhered preferentially to the cellophane, and were pulled away from the body of the mix to leave a rough textured surface.

FIG. 6 shows a cathode mix of a composition identical with that shown in FIG. 5, and in particular with the same water content, but blended for 2 hours with a motor driven overhead stirrer. The characteristically different smooth wet rippled appearance of the mix surface is apparent, although the layer was drying out rapidly even while the photograph was being made. Essentially all of the mix separated cleanly from the wet cellophane, contributing to the smooth surface appearance seen in FIG. 6.

Electrical performance of batteries made as just described and illustrated in FIGS. 5 and 6 will be discussed in more detail below. Briefly, both have excellent characteristics by prior art standards, but the preferred batteries of FIG. 5 show a distinct superiority in their ability to recharge an electronic flash unit in a short time.

FIGS. 10 and 11 offer another illustration of the physical differences between a mix in accordance with the preferred embodiment of invention and one that is otherwise identical, but has been over-mixed. Because the adhesion of the best mixes to conductive plastic is very good, it is not feasible to make a photograph such as that of FIG. 5, but showing the other side of the cathode slurry, by dissection of an actual battery. In order to avoid this difficulty, two 1.5 gram patches of a mix such as that used to make the battery of FIG. 5 were spread on the dull side of two pieces of 2 mil Condulon conductive vinyl film each 2¾ × 3⅜ inches. (Condulon film is made by solvent casting on a release sheet, and drying to remove the solvent. The dull side is the drying side, not in contact with the release sheet.) The two coated sheets were then pressed together and smoothed to blend the two patches of cathode mix together. Next, the two vinyl sheets were peeled apart, placed side-by-side and quickly photographed to obtain the result shown in FIG. 10. As shown, for the most part failure occurred in the slurry, indicating that the bond between the slurry and the conductive plastic is stronger than the cohesive forces in the slurry.

FIG. 11 is a photograph made in the same way as the photograph of FIG. 10, with the same lighting and camera angle, except that an over-mixed cathode slurry such as that used to make the photograph of FIG. 6 was employed. Despite the fact that the slurry composition was identical to that used to make the photgraph of FIG. 10, the failure mode on peeling was quite different. In particular, failure occurred primarily between the surface of the vinyl sheet on the left in FIG. 11 and the cathode slurry, which is primarily located on the vinyl sheet on the right in FIG. 11. A wet, shiny film of liquid on the vinyl surface, and a similar wet surface on the slurry, is most clearly apparent just as the films are pulled apart; particularly on the vinyl sheet, it dries within seconds because it is quite thin and there is no source to replenish it.

Batteries made in accordance with the preferred embodiment of the invention except that various binders or dispersants are included exhibit many of the advantages of the invention, but are less effective under conditions of high current drain, as for the rapid recharge of an electronic flash unit. Illustrative of such batteries are those described in Examples II and III below.

EXAMPLE II

Six four-cell batteries were made exactly as described in Example I, above, except that 2.9 percent by weight of BP-100, a latex made and sold by Exxon Chemical Co. of Houston, Tex., was included in the cathode mix. These batteries, identified below as IIA through IIF, were measured in the manner described above after 4 days, with the following results:

| Battery | OCV | CCV |
| --- | --- | --- |
| IIA | 6.63 | 6.07 |
| IIB | 6.63 | 6.06 |
| IIC | 6.72 | 6.09 |
| IID | 6.68 | 6.08 |
| IIE | 6.69 | 6.06 |
| IIF | 6.58 | 5.93 |
| Average | 6.66 | 6.05 |

EXAMPLE III

Five four-cell batteries were made exactly as described in Example I, above, except that 1.52 percent by weight of 2-acrylamido-2-methylpropane sulfonic acid was included in the cathode mix. These batteries, identified below as IIIA through IIIE, were measured in the manner described above after 4 days, with the following results:

| Battery | OCV | CCV |
| --- | --- | --- |
| IIIA | 6.72 | 5.67 |
| IIIB | 6.69 | 5.67 |
| IIIC | 6.68 | 5.73 |
| IIID | 6.70 | 5.69 |
| 111E | 6.68 | 5.57 |
| Average | 6.69 | 5.67 |

Figure 7:
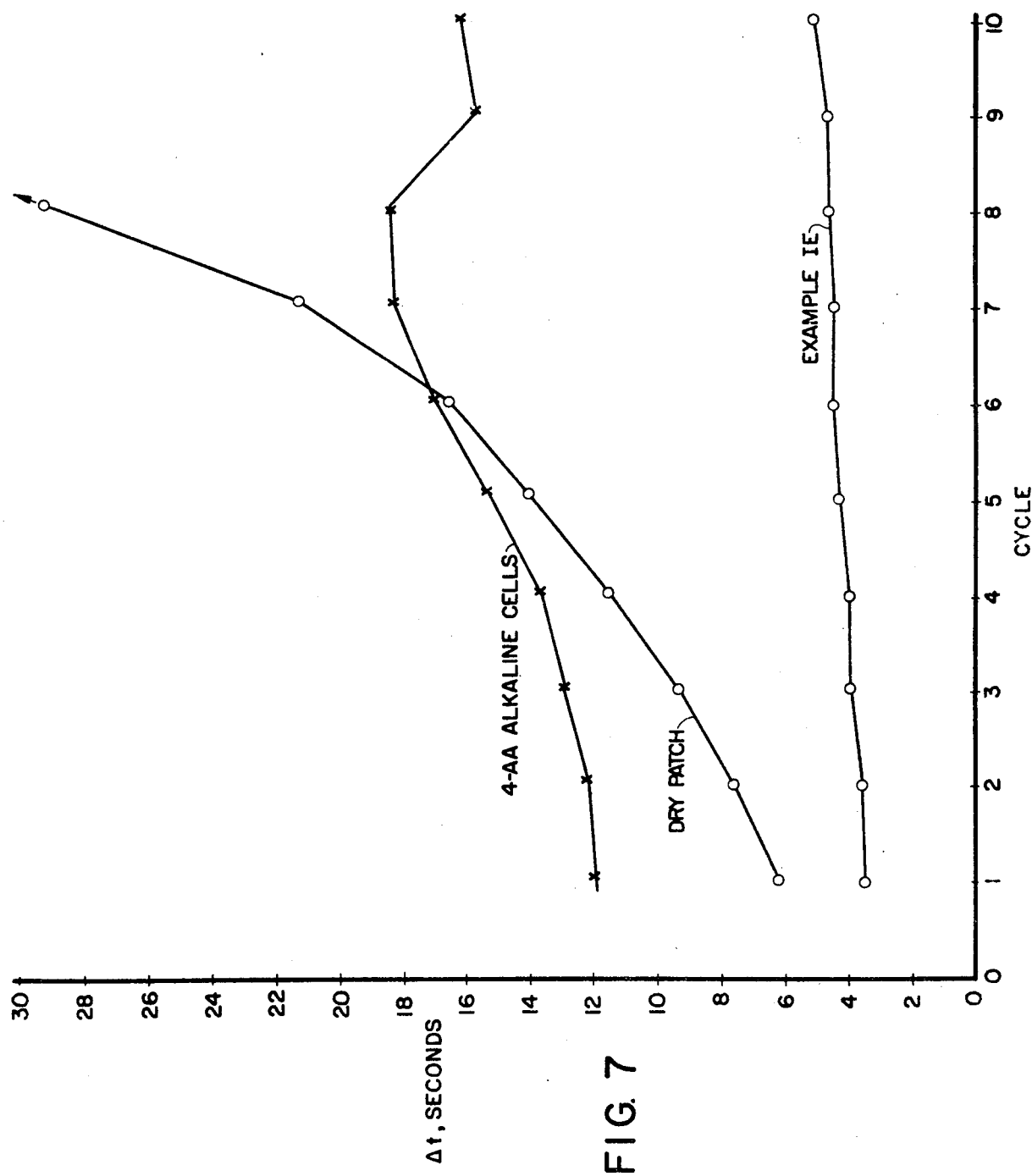
FIG. 7 is a graph illustrating the relative performance of three types of batteries in an electronic flash recharging test.

FIG. 7 is a graph illustrating the superior performance of batteries in accordance with the invention in the rapid recharging of an electronic flash unit, as compared with batteries of different constructions. For this test, an SX-70 Land camera was fitted with an electronic flash unit having a light output of about 37 watt seconds, and an input energy requirement of about 80 watt seconds. The flash unit was connected to be charged from the battery under test. The battery was also used to energize the camera to perform the functions of exposure control and film advance in the normal manner, except that, experience having shown that advancing film units through the processing rolls made no detectable difference in the test, no film units were employed. In the test, the initially discharged flash unit is charged unit its ready light glows. The shutter button of the camera is then operated, causing the camera to go through its cycle, during which time the flash unit is discharged. The battery is then electrically disconnected, and allowed 30 seconds to recover. This cycle is estimated to require a total energy of about 90 to 100 watt seconds, and is carried out ten times to simulate a ten-shot photographic sequence. Each time the flash unit is charged during the test, the time between the start of charge and the time when the ready light glows and charging is stopped is noted.

FIG. 7 shows the results of the above test as applied to the battery of Example IE, above; to a dry patch battery of the kind described in my copending U.S. application Ser. No. 647,590 cited above and using dry patch cathode and anode constructions, both coated with gel electrolyte as there described; and to four AA size alkaline cells in series. The alkaline batteries used were fresh Eveready 1.5 volt size AA No. E91 batteries made by Union Carbide Co. Four of these batteries were hard wired in series with soldered connections to eliminate contact resistance.

As shown in FIG. 7, the dry patch battery, which was identical to the thin flat battery sold as part of the Polaroid SX-70 film pack, showed superiority to the alkaline cells up to the sixth shot, and thereafter the recycle time rapidly and substantially increased. The wet mix battery of Example IE is clearly superior to either.

In order to measure the effect of the cathode weight in dry patch batteries, and to isolate this effect from the effects of differences in structure, a standard production battery of the kind sold in Polaroid SX-70 film packs, including dry patch anodes and cathodes as described above, was tested by the method described above in comparison with two other batteries of essentially the same construction but with heavier cathodes. In this case, the tests were extended until the battery failed to perform. One of these had cathode patches weighing from 2.5 to 3 grams each, and the other had cathode patches weighing 4 grams each. The test results were as set out in Table I below:

TABLE I

| | DRY PATCH CATHODE WEIGHT, GRAMS | | | | | |
| --- | --- | --- | --- | --- | --- | --- |
| | 1.35 | | 2.5 to 3.0 | | 4.0 | |
| CYCLE | Δt | S | Δt | S | Δt | S |
| 1 | 5.2 | 5.2 | 4.8 | 4.8 | 5.6 | 5.6 |
| 2 | 6.2 | 11.4 | 5.4 | 10.2 | 6.0 | 11.6 |
| 3 | 7.0 | 18.4 | 6.2 | 16.4 | 6.8 | 18.4 |
| 4 | 8.6 | 27.0 | 7.0 | 23.4 | 7.6 | 26.0 |
| 5 | 10.0 | 37.0 | 8.0 | 31.4 | 8.4 | 34.4 |
| 6 | 12.6 | 49.6 | 8.4 | 39.8 | 9.2 | 43.6 |
| 7 | 16.8 | 66.4 | 9.2 | 49.0 | 10.2 | 53.8 |
| 8 | 27.4 | 93.8 | 10.0 | 59.0 | 11.4 | 65.2 |
| 9 | 67.0 | 160.8 | 10.8 | 69.8 | 12.8 | 78.0 |
| 10 | Failed | | 13.2 | 83.0 | 14.8 | 92.8 |
| 11 | | | 16.4 | 99.4 | 17.8 | 110.6 |
| 12 | | | 20.4 | 119.8 | 18.6 | 129.2 |
| 13 | | | 26.0 | 145.8 | 23.8 | 153.0 |
| 14 | | | 40.0 | 185.8 | 30.8 | 183.8 |
| 15 | | | Failed | | 42.2 | 226.0 |
| 16 | | | | | Failed | |

In the above table Δt is the charge time in seconds for each cycle, and S is the cumulative total charge time. As indicated by the fact that it carried out 15 cycles before failure, and as would be expected, the battery with the 4 gram cathodes had more energy capacity than the battery with 2.5 to 3 gram cathodes. However, the latter gave shorter recharge times up through the 11th cycle, and a shorter total time through the 13th cycle. For a photographic system in which 10 cycles are expected, these shorter times are clearly preferable to more ultimate capacity.

Figure 8:
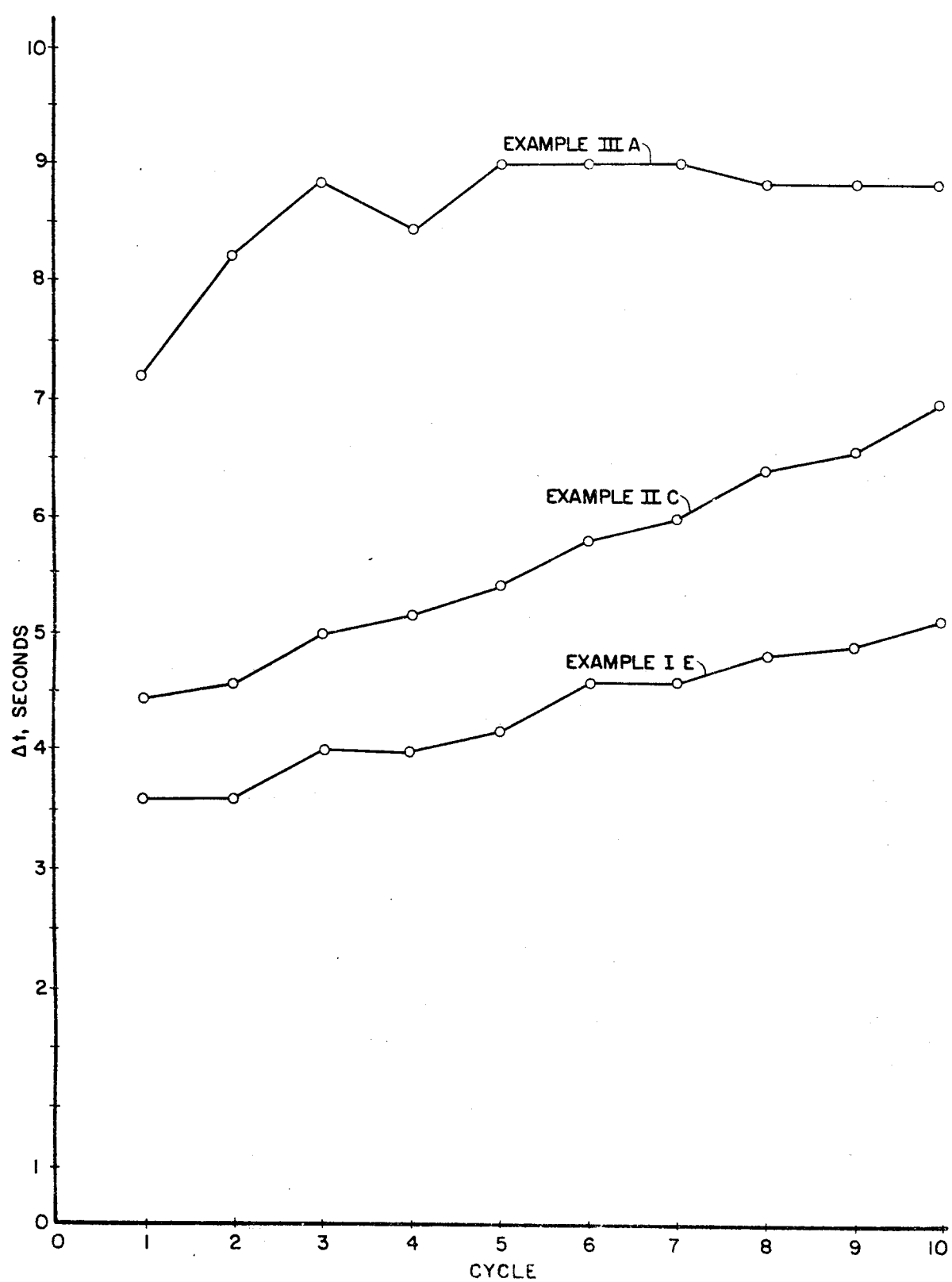
FIG. 8 is a graph on a larger scale than FIG. 7 and showing comparative performance of a number of batteries, including the preferred embodiment of the invention, in an electronic flash unit recharging test.

FIG. 8 is a graph similar to FIG. 7, but on a considerably larger scale for a better comparison between batteries in accordance with the invention. The preferred embodiment, typified by Example IE, is clearly superior to the batteries with BP-100 binder, typified in FIG. 8 by the battery of Example IIC, above, and both batteries are clearly superior to the batteries including 2-acrylamido-2-methylpropane sulfonic acid as a binder and dispersant, typified in FIG. 8 by the battery of Example IIIA above.

EXAMPLE IV

Three four-cell batteries were made in accordance with Example I above, except that the cathodes were mixed for 4 minutes in a Pony mixer as described above in connection with FIG. 5. One of these batteries was dissected for use in making the photographs of FIG. 5. A second battery of this series, identified as Example IVA below, was tested in the electronic flash and camera method described above, on the day of manufacture. A third battery, Example IVB below, was tested on the third day after manufacture. Both tests were limited to 10 shots. A fourth battery, Example IVC below, was similarly tested on the third day after manufacture, but in this case the test was extended until battery failure. Test results were as shown in Table II below, given in the same terms as defined above in connection with Table I. Average values through 10 shots are for all three examples.

TABLE II

| | EXAMPLE | | | | | | | |
|---|---|---|---|---|---|---|---|---|
| | IV C | | IV B | | IV A | | AVERAGE | |
| CYCLE | Δt | S | Δt | S | Δt | S | Δt | S |
| 1 | 3.2 | 3.2 | 3.4 | 3.4 | 3.4 | 3.4 | 3.33 | 3.33 |
| 2 | 3.8 | 7.0 | 3.8 | 7.2 | 3.5 | 6.9 | 3.70 | 7.03 |
| 3 | 4.0 | 11.0 | 4.0 | 11.2 | 3.8 | 10.7 | 3.93 | 10.97 |
| 4 | 4.2 | 15.2 | 4.0 | 15.2 | 4.0 | 14.7 | 4.07 | 15.03 |
| 5 | 4.4 | 19.6 | 4.4 | 19.6 | 4.2 | 18.9 | 4.33 | 19.37 |
| 6 | 4.6 | 24.2 | 4.4 | 24.0 | 4.4 | 23.3 | 4.47 | 23.83 |
| 7 | 4.6 | 28.8 | 4.8 | 28.8 | 4.6 | 27.9 | 4.67 | 28.50 |
| 8 | 4.8 | 33.6 | 4.8 | 33.6 | 4.8 | 32.7 | 4.8 | 33.30 |
| 9 | 5.0 | 38.6 | 5.0 | 38.6 | 5.0 | 37.7 | 5.0 | 38.30 |
| 10 | 5.2 | 43.8 | 5.2 | 43.8 | 5.2 | 42.9 | 5.2 | 43.5 |
| 11 | 5.4 | 49.2 | | | | | | |
| | STOPPED TEST | | | | | | | |
| 12 | 5.6 | 54.8 | | | | | | |
| 13 | 5.8 | 60.6 | | | | | | |
| 14 | 6.2 | 66.8 | | | | | | |
| 15 | 6.4 | 73.2 | | | | | | |
| 16 | 6.6 | 79.8 | | | | | | |
| 17 | 7.0 | 86.8 | | | | | | |
| 18 | 7.4 | 94.2 | | | | | | |
| 19 | 7.8 | 102.0 | | | | | | |
| 20 | 8.0 | 110.0 | | | | | | |
| 21 | 8.8 | 118.8 | | | | | | |
| 22 | 9.2 | 128.0 | | | | | | |
| 23 | 10.0 | 138.0 | | | | | | |
| 24 | 10.8 | 148.8 | | | | | | |
| 25 | 11.6 | 160.4 | | | | | | |
| 26 | 12.2 | 172.6 | | | | | | |
| 27 | 13.8 | 186.4 | | | | | | |
| 28 | 15.2 | 201.6 | | | | | | |
| 29 | 18.0 | 219.6 | | | | | | |
| 30 | FAILED | | | | | | | |

EXAMPLE V

Three four-cell batteries were made in accordance with Example 1 above, except that the cathodes were mixed for 2 hours with an overhead stirrer as described above in connection with FIG. 6. One of these batteries was disected for use in making the photograph of FIG. 6. A second battery of this series, identified as Example VA below, was tested in the electronic flash and camera method described above, on the day of manufacture. A third battery, Example VB below, was tested on the third day after manufacture. Both tests were limited to 10 shots. A fourth battery, Example VC below, was similarly tested on the third day after manufacture, but in this case the test was extended until battery failure. Test results were as shown in Table III below.

TABLE III

| | EXAMPLE | | | | | | | |
|---|---|---|---|---|---|---|---|---|
| | V C | | V B | | V A | | AVERAGE | |
| CYCLE | Δt | S | Δt | S | Δt | S | Δt | S |
| 1 | 4.4 | 4.4 | 3.8 | 3.8 | 3.8 | 3.8 | 4.0 | 4.0 |
| 2 | 4.8 | 9.2 | 4.4 | 8.2 | 4.2 | 8.0 | 4.47 | 8.47 |
| 3 | 5.0 | 14.2 | 4.6 | 12.8 | 4.6 | 12.6 | 4.73 | 13.20 |
| 4 | 5.4 | 19.6 | 5.0 | 17.8 | 4.8 | 17.4 | 5.07 | 18.27 |
| 5 | 5.6 | 25.2 | 5.2 | 23.0 | 5.0 | 22.4 | 5.27 | 23.53 |
| 6 | 5.8 | 31.0 | 5.4 | 28.4 | 5.2 | 27.6 | 5.47 | 29.00 |
| 7 | 6.0 | 37.0 | 5.6 | 34.0 | 5.4 | 33.0 | 5.67 | 34.67 |
| 8 | 6.0 | 43.0 | 5.8 | 39.8 | 5.6 | 38.6 | 5.80 | 40.47 |
| 9 | 6.2 | 49.2 | 6.0 | 45.8 | 5.8 | 44.4 | 6.00 | 46.47 |
| 10 | 6.4 | 55.6 | 6.2 | 52.0 | 6.0 | 50.4 | 6.20 | 52.67 |
| 11 | 6.8 | 62.4 | | | | | | |
| | STOPPED TEST | | | | | | | |
| 12 | 7.2 | 69.6 | | | | | | |
| 13 | 7.4 | 77.0 | | | | | | |
| 14 | 7.8 | 84.8 | | | | | | |
| 15 | 8.0 | 92.8 | | | | | | |
| 16 | 8.4 | 101.2 | | | | | | |
| 17 | 8.8 | 110.0 | | | | | | |
| 18 | 9.4 | 119.4 | | | | | | |
| 19 | 9.8 | 129.2 | | | | | | |
| 20 | 10.4 | 139.6 | | | | | | |
| 21 | 11.2 | 150.8 | | | | | | |
| 22 | 12.0 | 162.8 | | | | | | |
| 23 | 12.8 | 175.6 | | | | | | |
| 24 | 13.8 | 189.4 | | | | | | |
| 25 | 15.0 | 204.4 | | | | | | |
| 26 | 16.0 | 220.4 | | | | | | |
| 27 | FAILED | | | | | | | |

Figure 9:
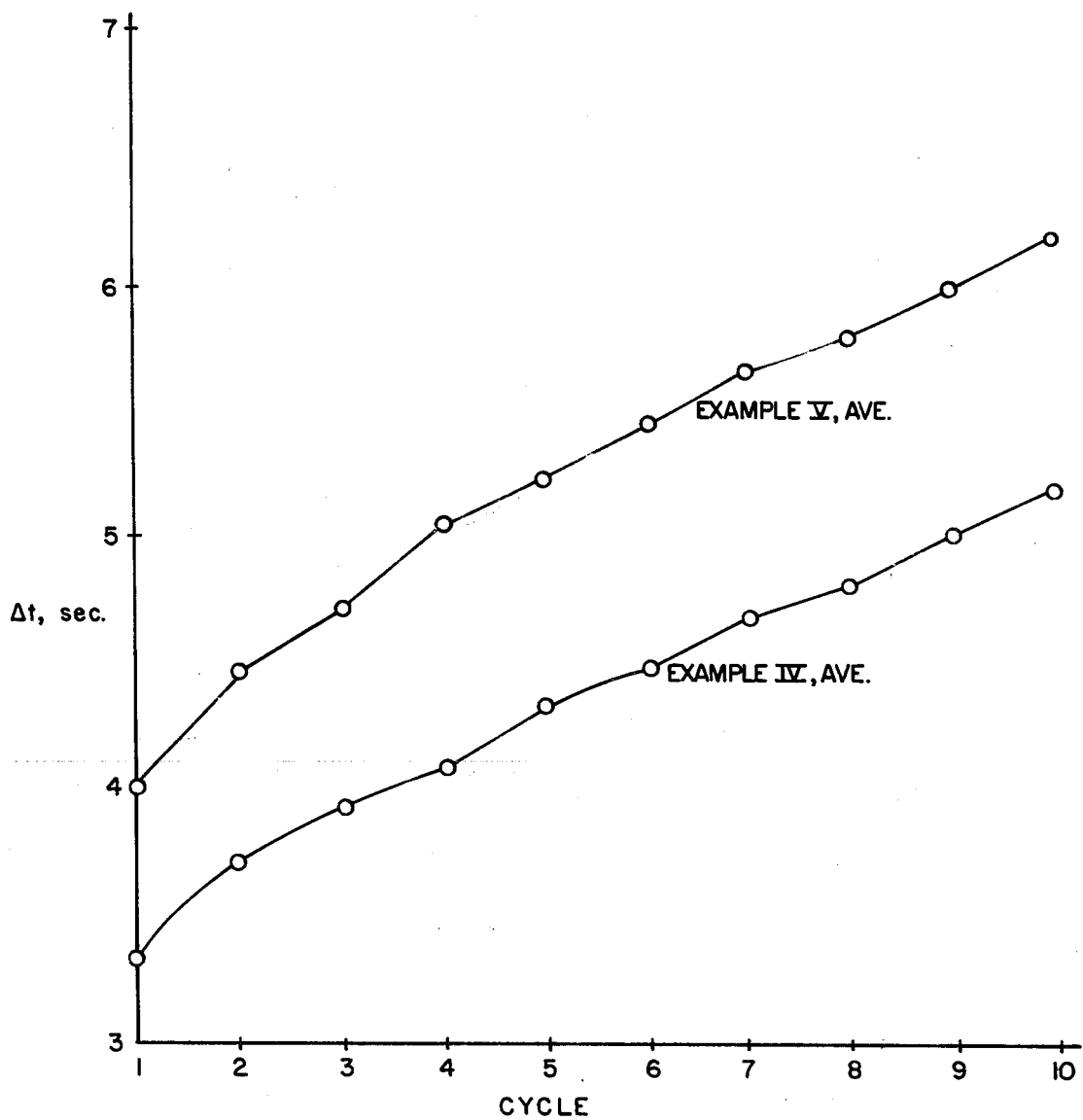
FIG. 9 is a graph on a larger scale than FIG. 8 and showing comparative performance of batteries in accordance with the invention with cathodes mixed for different times.

FIG. 9 is a graph similar to FIGS. 7 and 8, but on a still larger scale for better comparison between batteries in accordance with the invention of the type illustrated in FIGS. 5 and 6 and in Tables II and III above. The values plotted are the averages given in Table II for Examples IVA, IVB and IVC, and in Table III for Examples VA, VB and VC. While both sets of batteries show excellent performance, the preferred embodiments with short mix times exemplified by Example IV show a clear superiority.

While the regenerated cellulose separators have been found particularly useful in thin flat laminar batteries using dry patch anodes and slurry cathodes as described above, they have also been found well adapted for use in other Leclanche cell structures with acidic electrolytes. The surprisingly low impedance which the cellophane separator exhibits when wet with Leclanche electrolyte may not be an important factor in batteries for use in high impedance load circuits, or where the construction of the electrodes or other battery components introduce sufficient impedance so that any improvement afforded by the separator used would be masked. However, its positive inhibition against intracell shorting is an advantage in any Leclanche environment. Particular Leclanche cell and battery constructions in which the cellophane separator have been very successfully employed are those thin flat laminar constructions incorporating composite electrodes, such as those more fully described in my above-cited copending U.S. application Ser. No. 647,590. Such a composite electrode comprises a dry patch anode or cathode stratum and a contiguous slurry anode or cathode stratum, respectively. A composite anode or cathode of this kind can be used with a complementary electrode that is either also of composite form, or that is either of dry patch or slurry form.

In general, where a dry patch electrode is to be incorporated in the construction of the cell, it is preferred to deposit it on the conductive plastic substrate as a particulate slurry dispersion of active electrode particles with a binder. This slurry dispersion is then dried to form an adherent and relatively porous dry patch electrode.

Formation of a composite electrode may then be completed by depositing an aqueous slurry dispersion of active electrode particles over the dry patch, which slurry dispersion is not dried prior to or during the assembly of the cell.

As more fully described in copending U.S. application for Letters Patent Ser. No. 744,871, filed on Nov. 24, 1976 by Sheldon A. Buckler for Flat Battery as a continuation-in-part of U.S. application Ser. No. 495,681, filed on Aug. 8, 1974 for Flat Battery and assigned to the assignee of this application, useful laminar batteries may be made in which both anode and cathode are in slurry form. It has been found that cellophane separators also have utility, and improve yields, in batteries of this kind.

Another form of battery in which cellophane separators have been shown to work well is essentially the same as the production battery of the kind sold in Polaroid SX-70 film packs, using dry patch anodes and cathodes and discussed above in connection with Table I. These batteries have been made with cellophane separators, and shown to give excellent performance.

Useful compositions for the manufacture of the various cell and battery constructions described above will next be given. These may be used alone or in combination with the negative dry patch, gel electrolyte and cathode slurry electrode compositions given above, together with separators of regenerated cellulose, in cells and batteries otherwise made in the manner described in detail above for the presently preferred embodiment of the invention.

| Negative Slurry Anode Composition | |
|---|---|
| Methocel 4000 | 2 gm |
| Ammonium chloride | 68 gm |
| Zinc chloride | 30.9 gm |
| Mercuric chloride | 5.9 gm |
| Powdered zinc | 300 gm |
| Water | 198 gm |

In the above composition, Methocel 4000 is methyl cellulose as made and sold by Dow Chemical Co. of Midland, Mich.

| Positive Dry Patch Cathode Composition | |
|---|---|
| Particulate magnesium dioxide | 1000 gm |
| Shawinigan, Black | 40 gm |
| BP-100 | 67.68 gm |
| Versene | 4.12 gm |
| Tetrasodium pyrophosphate | 10 gm |
| Lomar D | 3.85 gm |
| Water | in sufficient quantity for deposition |

In the above composition, BP-100 and Shawinegan Black are as described above. Versene is ethylene diamine tetra-acetic acid and is sold by Dow Chemical Co., Midland, Mich. Lomar D is a dispersing agent sold by Nopco Chemical Co., Newark, N.J.

While the invention has been described with respect to the details of various illustrative embodiments, many changes and variations will be apparent to those skilled in the art upon reading this description, and such can be made without departing from the scope of the invention.

Having thus described the invention, what is claimed is:

1. A flat laminar cell especially adapted for high-current drain applications without requiring external compression and comprising a zinc anode, a manganese dioxide cathode, and a separator consisting essentially of cellophane between said anode and said cathode, said manganese dioxide cathode comprising a slurry of manganese dioxide and carbon particles in an aqueous Leclanche-type electrolyte solution of ammonium chloride and zinc chloride, said manganese dioxide cathode slurry being essentially free of any polymeric binder, and a carbon-filled conductive polymer layer positioned on the other side of said manganese dioxide slurry from said cellophane separator, the water content and ratio of manganese dioxide to carbon being effective to cause said manganese dioxide cathode slurry to adhere to said carbon-filled conductive polymer without the continuous application of external pressure.

2. In a thin flat laminar cell especially adapted for high current drain applications without requiring external compression, a layer of cohesive cathode slurry adhering on one side to a sheet consisting essentially of regenerated cellulose and on the other side to a sheet of conductive plastic, said slurry consisting essentially of manganese dioxide and carbon black in an aqueous electrolyte solution of zinc chloride and ammonium chloride having a pH below 6 and containing at least twenty percent of water by weight of slurry, said slurry being essentially free of binders and being characterized by the retention of substantially all the water without the formation of a film of supernatant liquid at the interface between said slurry and said conductive plastic, said regenerated cellulose separating said cathode slurry from a zinc anode.

3. In a thin flat laminar cell especially adapted for high current drain applications without requiring external compression, a layer of cohesive cathode slurry consisting essentially of manganese dioxide and carbon black in an aqueous electrolyte solution of zinc chloride and ammonium chloride having a pH below 6 and containing at least 20 percent of water by weight of slurry, said slurry being essentially free of binders and being characterized by the retention of substantially all the water without the formation of a film of supernatant liquid at the boundary surfaces of said slurry, a sheet consisting essentially of regenerated cellulose adhering to one side of said slurry layer, and a sheet of conductive plastic adhering to the other side of said slurry layer, said cathode being in slurry form in said aqueous electrolyte said regenerated cellulose separating said cathode slurry from a zinc anode.

4. A thin flat laminar cell comprising a zinc anode, a manganese dioxide cathode, a separator consisting essentially of regenerated cellulose between said anode and said cathode, and an aqueous acidic electrolyte containing ammonium chloride and zinc chloride permeating said anode, said separator and said cathode, said cathode being in slurry form in said aqueous electrolyte.

5. A battery comprising a plurality of cells as defined by claim 4, said cells being connected in series.

6. A thin flat laminar cell especially adapted for high current drain applications without requiring external compression, comprising a conductive cathode current collector consisting essentially of carbon dispersed in a thermoplastic matrix, a layer of cathode mix adhering to said collector and comprising a cohesive dispersion of manganese dioxide and carbon black in an aqueous solution of an electrolyte consisting essentially of a mixture of zinc chloride and ammonium chloride, said cathode mix including in said aqeuous solution at least twenty percent by weight of water based on the total weight of said mix, a separator consisting essentially of regenerated cellulose adhesively united to said cathode mix by contact, and an anode containing zinc as the principal source of electrons bonded to said separator by a layer of gel electrolyte.

7. In a thin flat laminar cell especially adapted for high current drain applications without requiring external compression, a zinc patch anode coated with a layer of acidic gel electrolyte, a layer of cathode slurry comprising carbon black and manganese dioxide dispersed in an acidic electrolyte solution consisting essentially of water, zinc chloride and ammonium chloride and containing at least 20 percent by weight of water based on the total weight of cathode slurry, a separator consisting essentially of humectant-free regenerated cellulose between and in contact with both said gel electrolyte and said cathode slurry layer, and an electrolytic medium having a pH below 6 ionically connecting said anode to said cathode through said separator.

8. A thin, flat laminar cell especially adapted for high current drain applications without requiring external compression, comprising a conductive cathode current collector consisting essentially of carbon dispersed in a thermoplastic matrix, a layer of cathode mix adhering to said collector and comprising a cohesive dispersion of manganese dioxide and carbon black in an aqueous solution of an electrolyte, said electrolyte comprising water, zinc chloride and ammonium chloride, said cathode mix including in said aqeuous solution at least twenty percent by weight of water based on the total weight of said mix, said cathode mix being free of binders, a separator consisting essentially of regenerated cellulose adhesively united to said cathode mix by contact, and an anode containing zinc as the principal source of electrons bonded to said separator by a layer of gel electrolyte.

9. In a thin, flat laminar cell especially adapted for high current drain applications without requiring external compression, a zinc patch anode coated with a layer of acidic gel electrolyte, a layer of cathode slurry comprising carbon black and manganese dioxide dispersed in an acidic electrolyte solution consisting essentially of water, zinc chloride and ammonium chloride and containing at least 20 percent by weight of water based on the total weight of cathode mix, said cathode slurry being free of binders, and a separator consisting essentially of humectant-free regenerated cellulose between and in contact with said gel electrolyte and said cathode mix layer, said anode being ionically connected to said cathode through electrolyte permeating said separator.

* * * * *